July 7, 1970
N. T. RILEY
3,519,154
MOTOR VEHICLE BOAT LOADING AND UNLOADING HOIST MEANS
Filed Feb. 7, 1968
4 Sheets-Sheet 1
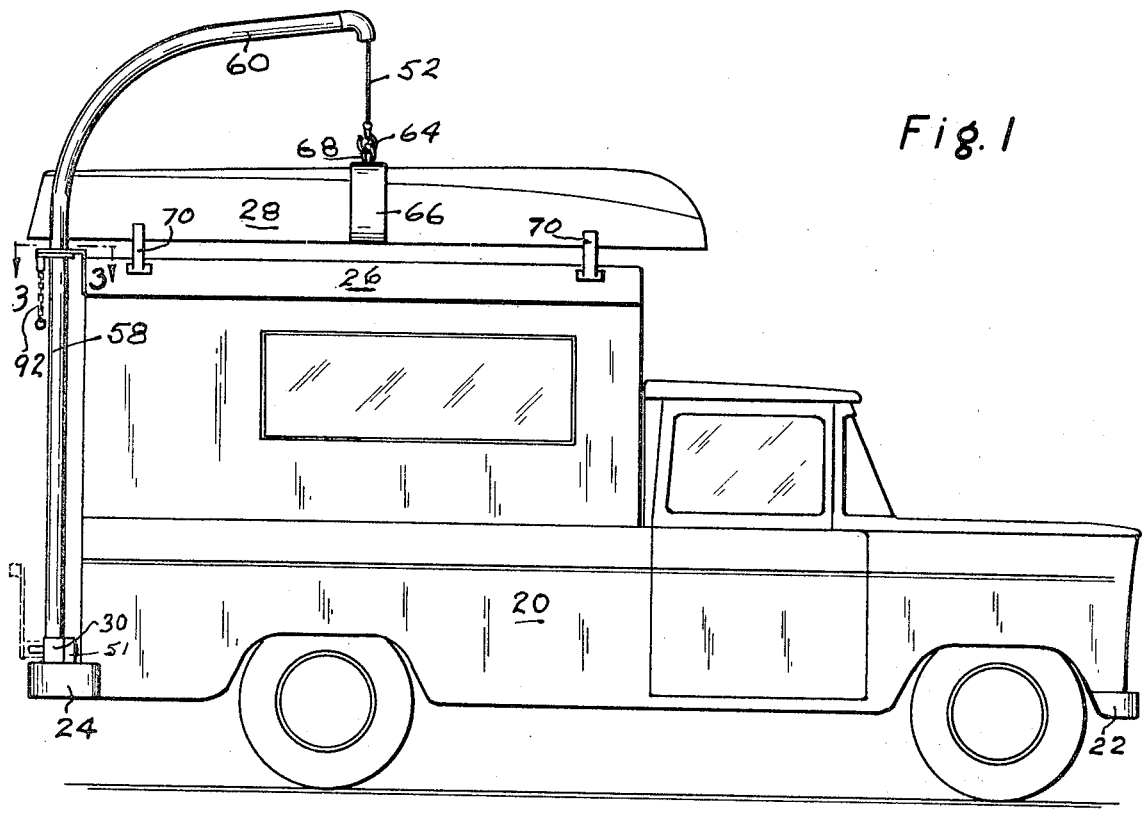
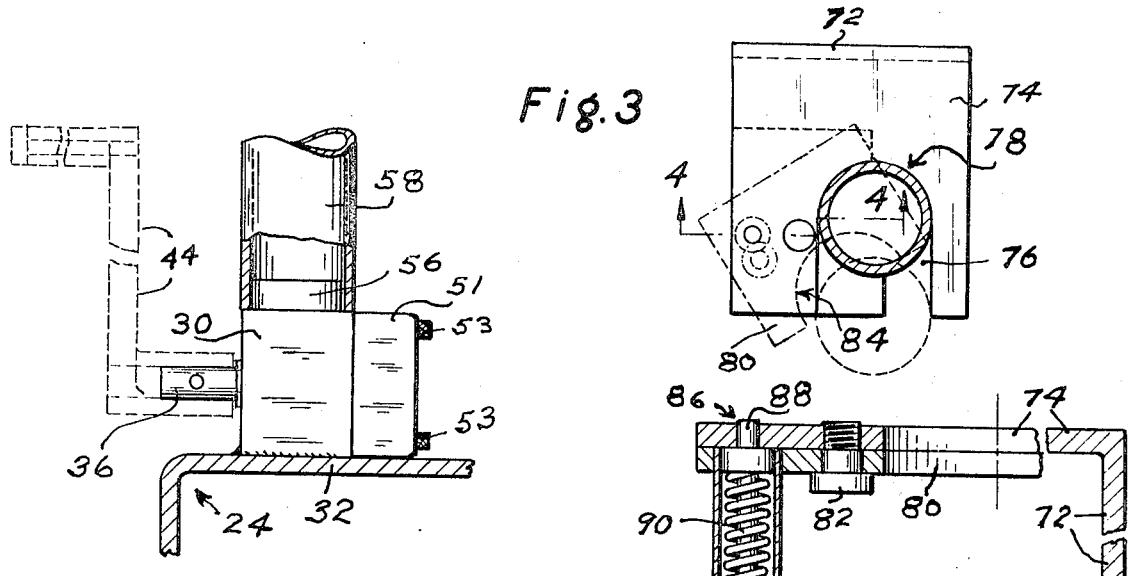
INVENTOR.
NOBLE T. RILEY
BY
T. W. Secrest
ATTORNEY July 7, 1970 N. T. RILEY 3,519,154
MOTOR VEHICLE BOAT LOADING AND UNLOADING HOIST MEANS
Filed Feb. 7, 1968 4 Sheets-Sheet 2
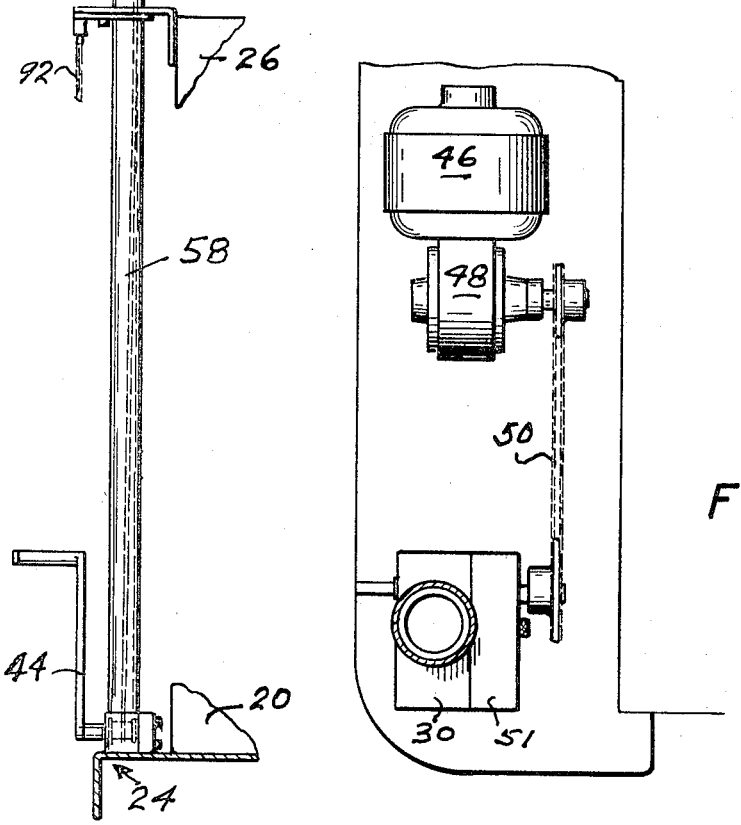
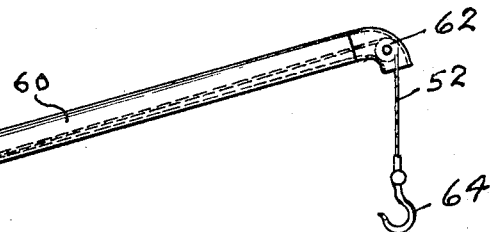
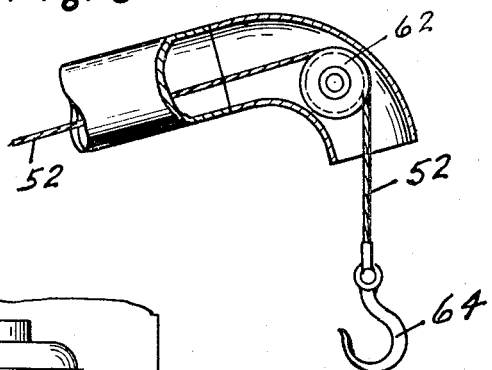
INVENTOR.
NOBLE T. RILEY
BY
T. W. Secrest
ATTORNEY July 7, 1970  N. T. RILEY  3,519,154
MOTOR VEHICLE BOAT LOADING AND UNLOADING HOIST MEANS
Filed Feb. 7, 1968  4 Sheets-Sheet 4

INVENTOR.
NOBLE T. RILEY
BY
T.W. Secrest

United States Patent Office 3,519,154
Patented July 7, 1970

3,519,154
MOTOR VEHICLE BOAT LOADING AND
UNLOADING HOIST MEANS
Noble T. Riley, Tacoma, Wash., assignor to Bellevue
Boat Lift Corporation, Seattle, Wash., a corporation
of Washington
Filed Feb. 7, 1968, Ser. No. 703,628
Int. Cl. B60p 1/54
U.S. Cl. 214—450                                2 Claims

ABSTRACT OF THE DISCLOSURE

This invention relates to a motor vehicle boat loading and unloading hoist means characterized by a gear box, having therein driving and driven gears, and which gear box is mounted on, and is supported by, a bumper of the vehicle. It is further characterized by a driving gear, actuated either manually or by a motor, and wherein the driven gear drives a rope drum. It is further characterized by a tubular member, having vertical and horizontal portions, and with its vertical portion connected with the gear box and such connection is preferably detachable and rotatable. A further characteristic is a hoist rope connected with and reeved about said drum and with the free end of such rope fed through said tubular member, suspended therefrom, and secured to the boat. A further characteristic is that a vertical portion of the tubular member has a top bearing supported by an upper portion of the vehicle. A further characteristic is that the boat is suspendedly supported by the free end portion of the rope and the rope is urged downwardly towards the vehicle by suitable holddown means, as straps—thus, the weight of the boat and the hold down means hold the boat in place and in turn hold the hoist means to the vehicle.

---

It is common for fishermen and vacationers, to desire, or to take with them on a trip, a boat, either to be rowed or powered by an outboard motor.

Heretofore such boats were generally transported with the vehicles of such parties on one or two wheeled trailers attached to their motor vehicles, as passenger cars, trucks, or camper-trucks.

Such use of trailers as a boat conveyance means has resulted in many distinct disadvantages. For example, the safe, and generally legal, maximum speeds on highways of a car-trailer combination is less than that of a car alone. Another disadvantage is that the available roads to desired remote inland waters, are often trails having infrequent car-turnaround areas and of very limited expanse. Such often presents to car-trailer combinations, either long car travel in a reverse direction, or the alternate of short forward and reverse car movement to maneuver a car-turnaround, all of which is tedious and sometimes beyond the skill of the driver of the car-trailer combination.

Another prior art practice is to employ a truck or trailer-camper to transport such boats. An obvious disadvantage of this is the loss of space in the truck which is often needed for the transportation of personnel, supplies, and gear necessary, or desired, for the fullest enjoyment of the trip.

The remaining expedient is to utilize a motor vehicle having a top deck and to load and unload a boat thereon or therefrom. However, the bulk and weight of most boats, and the elevation of the top deck of the motor vehicle from ground level, are factors which require mechanical hoist equipment. While hoist equipment may be readily provided about industrial sites and public launching sites, where the demand requires, it is quite another problem to provide suitable hoisting equipment for a single motor vehicle, carrying a boat on its upper deck, and of a nature to provide a minimum of interference when the vehicle is not used as a boat carrier.

It is an object of my invention to provide hoisting means for loading and unloading a boat onto and off the top deck of a motor vehicle and which motor vehicle has a bumper and suitable top deck, and which hoisting means may be readily operated by men, women, and children of limited physical strength.

A further object is to provide a gear box which is adapted to be secured to the bumper of such a vehicle, and which gear box includes a driving gear and a driven gear with a ratio therebetween to provide for the desired mechanical advantage, so that the driven gear will provide the desired hoisting thrust to raise or lower a boat for loading or unloading the same on or off a vehicle and with the desired minimum effort applied to the driving gear. The thrust on the driving gear may be manually applied, as by a crank, or if desired, by a motor, as an electric motor.

A further object is to connect the driven gear with a rotatable rope drum, having a rope reeved thereon, so that the turning movement of said drum results in the drawing in or the paying out of the free end of the rope.

A further object is to connect a tubular member to said gear box and to thread said rope through said tubular member.

A further object is to provide said tubular member with a vertical portion and a horizontal portion, vertical and horizontal being indexed from the use positions, and to connect the lower end of the vertical portion to said gear box. This connection is preferably detachable and rotatable to minimize interference when the hoist is not in use (the tubular member may be detached and stowed elsewhere) and when in use to provide for turning of the vertical portion about a vertical axis to aid in the loading and unloading of the boat to and from the vehicle.

A further object is to provide a bearing support for the vertical portion of said tubular member and at an elevation to obtain the greatest mechanical advantage in supporting said tubular member, as the elevation of the top deck of the motor vehicle.

A further object is to connect the free end portion of the rope extending downwardly from the horizontal portion of the tubular member to the boat for loading and unloading the boat.

A further object is to provide stop means for the driving and driven gears, as the driving gear, so that a boat may be suspendedly supported at a fixed elevation relative to the top deck of the vehicle. When so fixed in elevation, a boat may be swung horizontally from a position laterally of the vehicle to a position directly above the vehicle. Also, when suspended directly above the vehicle, the boat may be secured to the vehicle and the said securing means will provide a tension force acting through the boat to the hoisting rope and in turn to the hoist means and thus the hoist means will be secured to the vehicle.

The above mentioned general objects of my invention, together with others inherent in the same, will now become apparent or implicit as the detailed description of the drawings of my invention proceeds, wherein like reference numerals indicate like parts and wherein:

FIG. 1 is an elevational view of a motor vehicle, as a truck-camper, with my invention applied thereto;

FIG. 2 is a view on a larger scale than FIG. 1, with parts in section, parts in elevation, parts broken away, and parts in phantom, of the gear box and associated parts of my invention;

FIG. 3 is a plan view, on a larger scale than FIG. 1 and with parts in section, and taken substantially on broken lines 3—3 of FIG. 1;

FIG. 4 is a sectional view taken substantially on broken line 4—4 of FIG. 3;

FIG. 5 is an elevational view, on a larger scale than FIG. 1, of the tubular member and showing fragments of associated parts;

FIG. 6 is an enlarged fragmentary view, with parts broken away, of the tip end portion of the tubular member shown in FIG. 5;

FIG. 12 is a plan view of an alternative construction of my invention;

Figure 7:
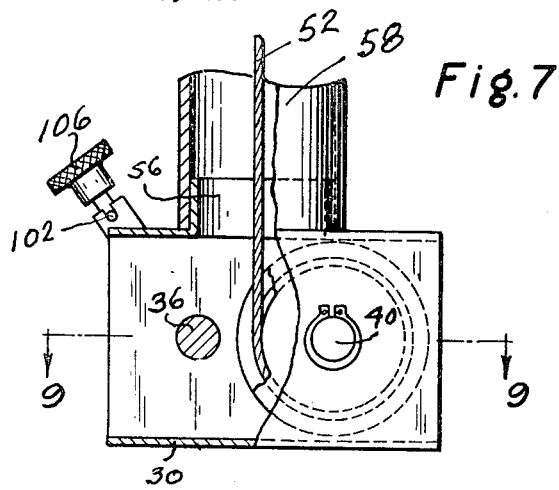
FIG. 7 is an elevational view, with parts in section, of the gear box and associated parts, and showing gear stop means.

In the drawings, a motor vehicle, of the type commonly termed a truck-camper, is illustrated and numbered 20. Front and rear bumpers 22 and 24 are standard on such vehicles 20. Also, such a vehicle 20 is provided with a top deck 26, either of suitable strength, as originally built or subsequently reinforced, to carry the weight of the boat and to otherwise function as is hereafter described more in detail. The boat 28 may vary in size and weight and in general will ordinarily be of the type commonly termed a rowboat, either powered by oars or by an external motor (not shown).

Where the type of motor vehicle is one where the greater portion of the body is over the rear wheels (such as in the truck-camper illustrated), then the gear box 30 (generally shown in FIGS. 1 and 5 and in more detail in FIGS. 2 and 7 to 12, inclusive) or the alternate form 27 (shown in FIGS. 13 to 15, inclusive), will preferably be secured to the rear bumper 24. However, when the body of the vehicle is distributed equally or substantially equally over the front and rear wheels (illustrated by a "Volkswagen Camper"), then the advantages of securing the gear box 30 or 27 to the rear bumper of the vehicle are not present.

In the forms of my invention best shown in FIGS. 1, 2, 7, 8, 9, 10, and 12, the gear box 30 is secured to one of the bumpers, as 24, by welding to a bumper deck 32 of said bumper. In the form of my invention shown in FIGS. 13, 14, and 15, a plate 21 is similarly secured to a bumper as 24. Plate 21 carries a pin 23. An opening 25 in gear box 27 (FIGS. 12, 13 and 14) may be registered with set pin 23, when the gear box 27 is in the dash line position as shown in FIG. 14. Then the gear box 27 may be angularly moved to the full line position and the plate 21 will snugly interfit within the walls forming gear box 27.

Figure 13:
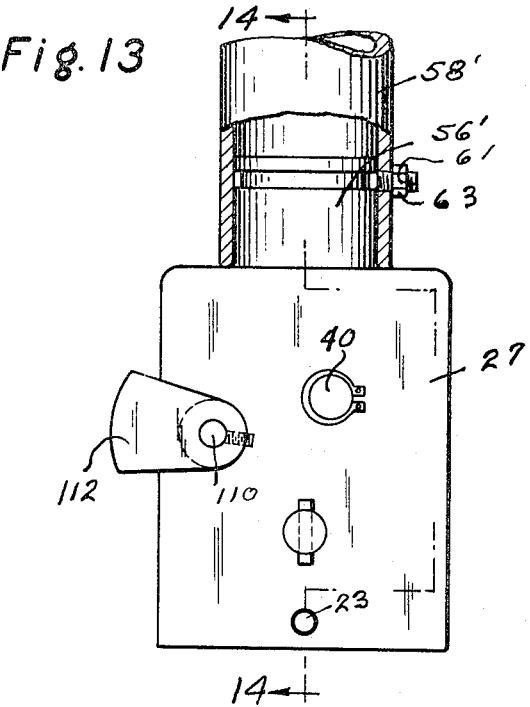
FIG. 13 is a fragmentary elevational view, with parts in section, of a modified form of my invention.
Figure 14:
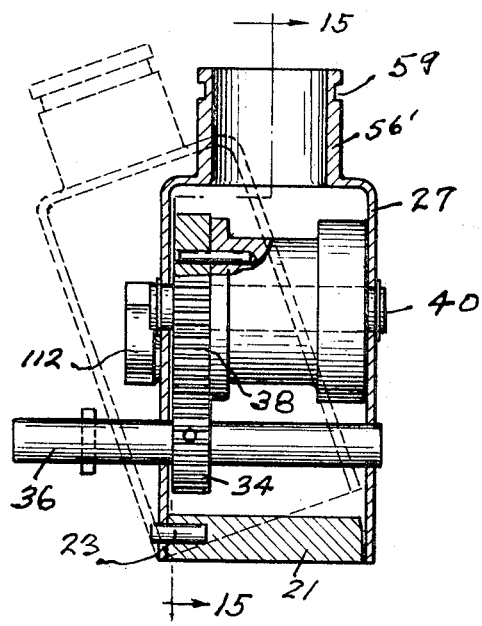
FIG. 14 is a view taken substantially on broken line 14—14 of FIG. 13.
Figure 15:
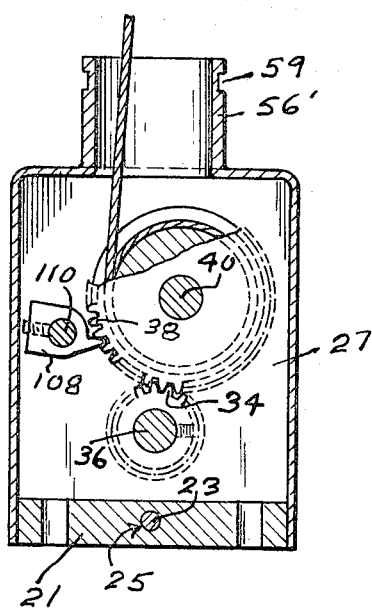
FIG. 15 is a view taken substantially on broken line 15—15 of FIG. 14.

As the same gear mechanisms, gear shafts, rope drums, and ropes may be enclosed in either the gear box 30 or the gear box 27, such parts are given the same numbers and the description given in connection with FIGS. 1, 2, 7, 8, 9, 10, and 12 will equally apply to FIGS. 13, 14, and 15.

A driving gear 34 (see FIG. 9) is rigid on shaft 36 mounted for rotation in gear box 30. Driving gear 34 meshes with driven gear 38 and the gear ratio therebetween is such as to provide the desired mechanical advantage so that gear 34 may be turned relatively small turning forces and the gear 38 will be driven at a reduced speed and with sufficient mechanical advantage to lift the load placed thereon in loading and unloading boats onto and off the top deck of a motor vehicle. A shaft 40 is rotatably mounted by gear box 30 and rigidly carries driven gear 38 and rope drum 42. Rotary motion is applied to the shaft 36 manually, as by the crank 44 (FIGS. 2 and 9), or by power, as by electric motor 46, gear reduction means 48, and chain and sprocket means 50 (see FIG. 12). End thrust collars or bearings are provided on shafts 36 and 40 for obvious purposes. In connection with FIGS. 1, 2, 7, 8, 9, 10, and 12, a cover 51 is detachably secured to gear box 30 by bolts 53 to permit ready inspection of gears 34 and 38. However, with the construction of FIGS. 12, 13, and 14, the gear box is in one piece and removable and hence, there is no need for a cover.

Figure 11:
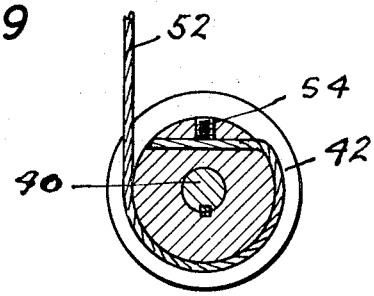
FIG. 11 is a view taken substantially on broken line 11—11 of FIG. 9.
Figure 10:
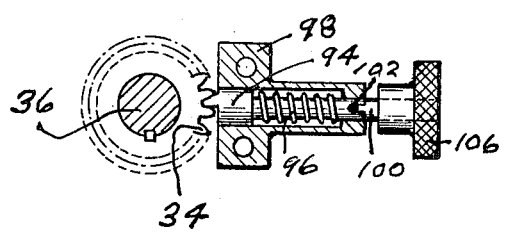
FIG. 10 is a detached view of a gear stop means shown in FIGS. 7 and 8.

Thus, by the application of turning motion to shaft 36 (either manual or power), meshing gears 34 and 38 are rotated, and rope drum 42 is rotated. Rope 52 (formed of the usual materials, as wire, organic, vegetable, or synthetic) has its fixed end portion secured to the rope drum 42, as by clamp screw means 54 (FIG. 11). The shaft 36 may be turned in either direction, and in one direction, rope 52 is reeved in and on rope drum 42 and in the other direction rope 52 is paid out from drum 42.

Figure 8:
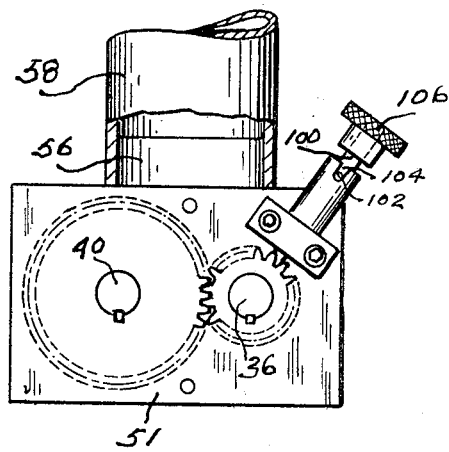
FIG. 8 is a view similar to FIG. 7 but taken from the opposite side.
Figure 9:
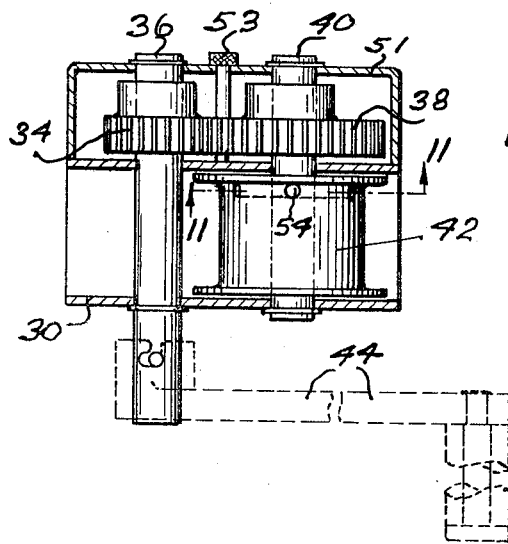
FIG. 9 is a view taken substantially on broken line 9—9 of FIG. 7 and showing a crank in phantom.

In connection with the structure typified by FIG. 2, the upper portion of the gear box 30 rigidly carries a stud or vertical cylindrical bearing 56 (FIGS. 2, 7, and 8). A tubular member comprises a vertical tubular portion 58 and a horizontal tubular portion 60. The lower end portion of the vertical tubular portion 58 slidingly fits over the stud bearing 56 and thus the said two parts are detachably and rotatably interconnected.

In connection with the structure of FIGS. 13, 14, and 15, the vertical tubular portion 58' corresponds to the vertical tubular portion 58 of the previous figures and is detachably and rotatably supported by a stud or vertical cylindrical bearing 56' carried by the gear box 27. In addition and as an alternate construction, the said bearing 56' preferably is provided with an annular groove 59. A bolt 61 is threadedly connected with tubular portion 58' and is moved into the groove 59 sufficiently to connect tubular portion 58' with bearing 56' and permit rotary movement. Also, the bolt 61 may be retracted from the groove 59 to remove tubular member 58' from the bearing 56'. Lock nut 63 is threaded on bolt 61 for locking or unlocking turning movement of the bolt 61.

Rope 52 from rope drum 42 is threaded through the opening in tubular support 58 or 58', 60 (hereinafter collectively termed tubular member 58, 60), over guide pulley 62, and terminates in suitable means for detachably connecting rope 52 with boat 28, as hook 64 (FIGS. 1, 5, and 6). Strap means 66 surrounds boat 28 and at the longitudinal center of balance thereof (for easier handling of the boat 28 during hoisting or unloading operations) and strap means 66 carries an eyelet 68 for detachable connection with the hook 64 connected with the free end portion of the rope 52.

Preferably the boat 28 is secured to the top deck 26 of the vehicle 20 by longitudinally spaced, detachable strap means 70. Thus, if the said strap means 70 are first somewhat tightened and then tension is placed on the rope 52, boat 28 is held in stowed position by a downward stress on strap means 70 and by an upward stress on rope 52. This not only holds the boat 28 in stowed position but urges the tubular support 58, 60 downwardly and against the stud bearing 56 or 56'.

The stud bearing 56 (or the stud bearing 56') not only detachably supports the tubular member 58, 60, but also provides a lower rotary support for the tubular member 58, 60. An upper bearing and detachable support for the tubular member 58, 60 is provided and preferably at an elevation relatively high on said vertical tubular portion 58 thereof for best mechanical advantage as a support. This upper bearing support comprises a fixed bracket (see in general FIGS. 1 and 5 and for details in FIGS. 3 and 4) comprising a plate 72 adapted to be secured to the top deck 26 of the vehicle 20. A suitable angular position of the plate 72 for such purposes is vertical and the plate 72 is thus so shown, however, some top deck portions of vehicles may require other angular positions of plate 72. A horizontal plate 74 is preferably integral with the plate 72 and said plates 72, 74 form a fixed plate support means. The plate 74 has an open slot 76, preferably terminating in a circular portion 78 mating the external surface of tubular portion 58. Thus, the vertical tubular portion 58 may be swung into and out of the open slot 76 and interfit with the same. The remainder of the upper bearing for the tubular portion 58 comprises a movable plate 80. A cap screw 82 is threaded into a suitable tapped opening in plate 74 and said cap screw 82 pivotally mounts movable plate 80 on fixed plate 74. Movable plate 80 is provided with a mating circular portion 84 (mating portion 78) so that when plate 80 is in closed position, the circular portions 78 and 84 will surround the vertical tubular portion 58 and function as a support and bearing therefor.

Fixed plate 74 has an opening 86 therein. A spring loaded pin 88 is carried by movable plate 80 and when the plate 80 is moved to said closed position, the spring 90 will urge the pin 88 into the opening 86. A pin release chain 92 depends from pin 88, for easy access, and when the pin 88 is moved out of the opening 86, the plate 88 may be moved out of the way and the tubular portion 58 may be moved laterally out of the upper bearing (plates 74 and 80). Thereafter, the tubular portion 58 may be raised from the stud bearing 56 or 56' and removed. The tubular member, when not in use, may be readily removed and stored, as desired in the vehicle 20, until the same is needed.

In operating the structures of my invention, the tubular member 58, 60 is installed by fitting the lower end portion of the vertical portion 58 or 58' in place over the stud bearing 56 or 56'. Then the tubular member 58, 60 is swung into place to engage the vertical portion 58 or 58' in the upper bearing provided by horizontal fixed plate 74 and movable plate 80. A pull is exerted on release chain 92, pulling pin 88 out of opening 86, and releasing movable plate 80 so the same may be moved out of the way permitting the tubular portion 58 or 58' to be moved into the slot 76 and against the circular portion 78. After the tubular portion 58 or 58' is in the slot 76 and resting against the circular portion 78, then the movable plate 80 is turned to engage its circular portion 84 with the tubular portion 58 or 58', the pin 88 is urged by the spring 90 into the opening 86, and the upper bearing (plates 74 and 80) provides an upper bearing and support for the tubular member 58, 60.

After the hoist apparatus is so installed, the horizontal tubular portion 60 is swung laterally (about the bearing provided between the lower end of portion 58 or 58' and the stud bearing 56 or 56') so that the hook 64 will depend from rope 52 at a suitable location laterally or alongside the vehicle 20. Then a boat 28, having a strap means 66 and an eyelet 68 connected therewith, is located, preferably upside down, and within the reach of hook 64 after rope 52 has been appropriately paid out. The strap means 66 is preferably secured ot the boat 28 at the longitudinally disposed center of gravity of the boat 28 so that the boat will tend to maintain a horizontal position when suspended from a single supporting means, as strap means 66, eyelet 68, hook 64, and rope 52.

I preferably provide locking means for the meshing gears 34 and 38. Such may be in the form of a spring loaded pawl 94 (see FIGS. 7, 8, and 10) which pawl 94 is urged toward locking position with driving gear 34 by spring 96. Pawl 94 is slidingly mounted by a bracket means 98 suitably secured to the gear box 30. Pawl 94 has a shaft 100 which carries a cross pin 102. Bracket means 98 is provided with a cross slot or recess 104 and shaft 100 terminates in a knurled end 106 which may be readily finger grasped. Upon pulling out and then turning of the end 106, pawl 94 moves out of gear locking position and is held in such position by the cross pin 102. When the pawl 94 is out of gear locking position, the end portion 106 may be turned until the pin 102 is alined with the slot 104, and then the end 106 released, whereupon the spring 96 will urge the pawl 94 into gear locking position.

An alternate form of locking means for the meshing gears 34 and 38 is shown in FIGS. 13, 14, and 15. A pawl 108 is fixed on a shaft 110, which shaft 110 is rotatably mounted by gear box 27. A weight 112 is fixed on shaft 110 and when in the position shown in FIG. 13, urges the pawl 108 into gear locking position relative to gear 38. The pawl 108 is so positioned and shaped to function as a ratchet stop-locking movement of gear 38 in a clockwise direction (as viewed in FIG. 15) and permitting rotation of gear 38 in the opposite direction. When free rotation of gear 38 is desired, the weight 112 is moved 90° in a clockwise direction over that shown in FIG. 13.

After hook 64 is engaged with the eyelet 68, the pawl 94 is moved into gear release position (if the pawl 108 is involved, there will be the ratchet action release) and then power is applied to turn shaft 36 in the proper direction, either manually by crank 44 or by power from motor 46. Upon the turning of driving gear 34 in the proper direction, meshing driven gear 38 turns, rope drum 42 turns, and rope 52 is drawn in and reeved about said drum 42, and the boat 28 is hoisted. When the boat 28 is hoisted the desired amount, then the pawl 94 is moved into gear locking position with the driving gear 34 (or the pawl 108 will be in locking position), so that such elevated position can be maintained without power being maintained to the shaft 36. Then the tubular member 58, 60 is turned about a vertical axis until the boat 28 is suitably located above the top deck 26 of the vehicle 20. When a boat 28 is so located, strap means 70 are applied, and preferably tightened to the desired extent, to secure the boat 28 to the top deck 26 of the vehicle 20. In view of the fact that the rope 52 exerts its pressure upwardly against a mid portion of the boat 28 and the strap means 70 exert pressures downwardly at spaced apart locations from said upward thrust, a minimum of precision is needed in applying the straps 70. Next, preferably, the pawl 94 is moved out of gear locking position (or the pawl 108 will be maintained in ratchet release position) and a turning pressure is applied to the shaft 30 to ensure that tension is present in the strap means 70 restraining upward movement of the boat 28 from the top deck 26 and that tension is present in the rope 52 providing such upward tension. When the desired tensions are provided, then the pawl 94 is again positioned in gear locking position (or the pawl 108 is maintained in locking position). By providing tensions as described, the boat 28 is properly secured to the vehicle 20 and also there is a pressure urging the tubular portion 58 or 58' toward the stud bearing 56 or 56' which tends to hold the tubular member 58, 60 to the vehicle 20. Thus, a vehicle 20 may carry a boat 28 as illustrated in FIG. 1 of the drawing and with the tubular member 58, 60 utilized in holding the boat 28 in such position during travel of the vehicle 20.

Obviously, if desired, after the strap means 70 have been applied, the rope 52 may be provided with slack and the tubular member 58, 60 removed and stowed elsewhere on the vehicle 20 and then later installed for unloading the boat 28 from the top deck 26 of the vehicle 20. Also, in connection with the structure of FIGS. 13, 14, and 15, the gear box 27 may be removed. The method of unloading of the boat 28 from the vehicle 20 is believed now to be obvious in view of the detailed description of the loading of such boat 28 on such vehicle 20.

Obviously, changes may be made in the forms, dimensions, and arrangements of the parts of my invention without departing from the principles thereof, the

I claim:

1. Hoist means for loading and unloading a boat onto and off the top of a motor vehicle having a bumper and a top deck vertically disposed above said bumper comprising a gear box adapted to be secured to the bumper of the motor vehicle; a first gear in said gear box; driving means for said first gear; a second gear in said gear box meshing with said first gear; a rope drum connected with said second gear; a tubular member having a vertical portion connected with the gear box mounted for angular movement about a vertical axis and having a horizontal portion extending from the upper portion of said vertical portion; an upper tubular support rotatively connected with an upper portion of said vertical portion of the tubular member and adapted to be connected with the top deck of the motor vehicle; rope means reeved about said rope drum extended through said tubular member, with the free end portion depending from the horizontal portion of said tubular member; boat connecting means carried by the free end of said rope means and adapted to engage with a boat to load and unload the same from the top of a motor vehicle; the connection between the upper tubular support and the vertical portion of the tubular member is detachable; said connection comprises a fixed plate having therein an open slot terminating in a circular portion; a movable plate pivoted to said fixed plate and having an arc-shaped opening therein, which opening is positioned in the path of travel of a tubular member into and out of said slot in said fixed plate; and pin means for holding said movable plate by said fixed plate.

2. The combination of claim 1 wherein said pin means is spring loaded.

References Cited

UNITED STATES PATENTS

| | | | |
|---|---|---|---|
| 1,228,659 | 6/1917 | Garson | 212—59 |
| 1,509,800 | 9/1924 | Vogel | 212—61 |
| 2,565,091 | 8/1951 | Reed | 212—65 |
| 3,215,294 | 11/1965 | Salamin | 214—450 |
| 3,245,660 | 4/1966 | Ratcliff | 254—167 |

HUGO O. SCHULZ, Primary Examiner